(12) United States Patent
Gregson

(10) Patent No.: US 7,203,719 B2
(45) Date of Patent: Apr. 10, 2007

(54) METHOD AND SYSTEM TO MEASURE DISTRIBUTED SYSTEM'S RELATIVE SIZE

(75) Inventor: John J. Gregson, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 09/934,638

(22) Filed: Aug. 22, 2001

(65) Prior Publication Data

US 2003/0069945 A1    Apr. 10, 2003

(51) Int. Cl.
*G06F 15/16*    (2006.01)

(52) U.S. Cl. .................................... 709/200

(58) Field of Classification Search ........ 709/201–203, 709/249, 220, 223–226, 238–244, 200; 702/186; 711/173; 705/7–9; 370/254–258
See application file for complete search history.

(56) References Cited

U.S. PATENT DOCUMENTS

| | | | |
|---|---|---|---|
| 5,113,519 | A | 5/1992 | Johnson et al. |
| 5,440,719 | A | 8/1995 | Hanes et al. |
| 5,548,724 | A | 8/1996 | Akizawa et al. |
| 5,732,240 | A | 3/1998 | Caccavale |
| 5,742,819 | A | 4/1998 | Caccavale |
| 5,790,425 | A | 8/1998 | Wagle |
| 5,819,033 | A | 10/1998 | Caccavale |
| 5,892,937 | A | 4/1999 | Caccavale |
| 5,974,462 | A | 10/1999 | Aman et al. |
| 5,987,493 | A | 11/1999 | Rangan et al. |
| 5,996,090 | A | 11/1999 | Hellerstein |
| 6,086,618 | A | 7/2000 | Al-Hilali et al. |
| 6,173,322 | B1 | 1/2001 | Hu |
| 6,453,269 | B1 * | 9/2002 | Quernemoen ................ 702/186 |
| 6,694,419 | B1 * | 2/2004 | Schnee et al. .............. 711/173 |
| 6,725,250 | B1 * | 4/2004 | Ellis, III ..................... 709/201 |
| 6,807,580 | B2 * | 10/2004 | Freeman et al. ............. 709/249 |
| 6,898,564 | B1 * | 5/2005 | Odhner et al. ................ 703/21 |
| 2002/0026328 | A1 * | 2/2002 | Westerkamp et al. ........... 705/2 |

FOREIGN PATENT DOCUMENTS

WO    WO 0123974 A2 *    9/2000

OTHER PUBLICATIONS

Giladi et al., "SPEC as a Performance Evaluation Measure", Computer, vol. 28, Issue:8, Aug. 1995, pp. 33-42.*

* cited by examiner

*Primary Examiner*—Andrew Caldwell
*Assistant Examiner*—Kelvin Lin
(74) *Attorney, Agent, or Firm*—Scully, Scott, Murphy & Presser, P.C.; William E. Schiesser

(57) ABSTRACT

A method and system for measuring the size of a distributed system of interconnected servers. A weighted asymptotic function of the count of installed CPUs on each server is computed. A CPU factor is computed based on the server architecture and operating system. A second weighted asymptotic function of the amount of RAM installed on each server is computed. A normalizing factor representing a reference date, and a RAM factor based on server architecture is computed. The product of the two weighted factors is computed for each server, and the sum of the product for each interconnected server is computed. This sum indicates a normalized measure for the size of a server. Included in the computation are factors, such as "Server Image Power Raging" and Server Image Power class."

17 Claims, 3 Drawing Sheets

METHOD AND SYSTEM TO MEASURE DISTRIBUTED SYSTEM'S RELATIVE SIZE

BACKGROUND OF THE INVENTION

1. Field of the Invention

This invention generally relates to distributed computer systems, and more specifically, the invention relates to methods and systems to provide relative measurements of elements of distributed computer systems.

2. Prior Art

Vendors, consultants, and outsourcers have been searching for a method to normalize the size and function of servers, such as UNIX and Intel servers, with regard to the labor required to support them. This is a critical requirement because if one has a method to do this, then one can compare the labor to support one set of servers to another and account for the difference in relative sizes and functions of the servers.

Attempts have been made to use performance benchmarks to measure the relative size of servers e.g., SPECMarks from the SPEC organization or TPC-Cs from the TPC organization. These are impractical to use for the following reasons. The algorithms used are tied to current technology. As the technology changes, a new algorithm is published. For example, the original SPEC algorithm was targeted to uniprocessor systems. As multiprocessor system were developed, that algorithm was replaced with a newer one. Another reason that these prior art approaches are impractical is that they are published for a very small subset of servers. There is, accordingly, an important need for a method to measure all servers.

SUMMARY OF THE INVENTION

An object of this invention is to provide a method and system to measure the relative sizes of distributed computer systems.

Another object of the present invention is to provide a method and system to normalize the comparison of one computer server to another.

These and other objects are attained with a method and system for measuring the size of a distributed computer system of interconnected servers. A weighted asymptotic function of the count of installed CPUs on each server is computed. A CPU factor is computed based on the server architecture and operating system. A second weighted asymptotic function of the amount of RAM installed on each server is computed. A normalizing factor representing a reference date, and a RAM factor based on server architecture is computed. The product of the two weighted factors is computed for each server, and the sum of the product for each interconnected server is computed. This sum indicates a normalized measure for the size of a server. Included in the computation are factors, such as "Server Image Power Raging" and Server Image Power class."

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
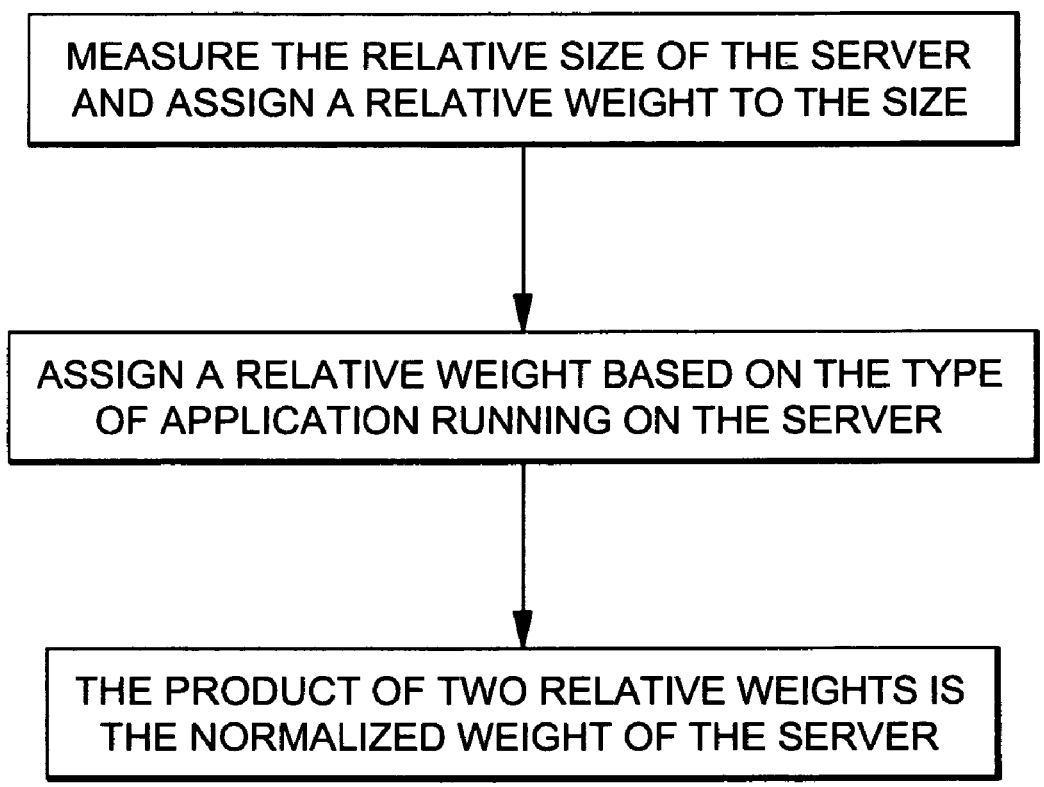
FIG. 1 outlines a method embodying an aspect of this invention.

Generally, the present invention provides a means to normalize the comparison of one computer server to another. With reference to FIG. 1, the method, generally, is to measure the relative size of the server and assign a relative weight to the size. Then to assign a relative weight based on the type of application running on the server. The product of the two is the normalized weight of the server.

More specifically, a formula is provided that allows one to determine whether a computer server is relatively equal, larger, or smaller in size to another. This formula calculates a value, Server Image Power Rating (SIPR), as follows:

$$SIPR = (Image\ CPUs) \times (Image\ RAM\ GB)$$

Thus, in accordance with this formula, the Server Image Power Rating is equal to the product of the number of central processing units (CPUs) in the image and the amount of gigabytes of processor main memory in that image.

The Server Image Power Rating is then applied to the following table to derive a value referred to as the Server Image Power Class (SIPC)

| SIPR | SIPC |
| --- | --- |
| ≦1 | 1 |
| ≦2 > 1 | 2 |
| ≦25 > 2 | 3 |
| ≦100 > 25 | 4 |
| ≦512 > 100 | 5 |

From the SIPC, one assigns the relative weight. The table can be further expanded to accommodate increasingly large systems.

An alternate approach is to include the relative I/O of the server as an additional factor in the SIPR formula. The formula then becomes:

$$SIPR = (Image\ CPUs) \times (Image\ RAM\ GB) \times (I/O\ Adapter\ for\ the\ Image)$$

Thus, in accordance with this formula, the Server Image Power Rating is equal to the product of the number of central processing units (CPUs) in the image, the amount of gigabytes of processor main memory in that image, and the number of input/output cards installed in that image.

As an example, three categories can be assigned to the types of applications that run on servers: Simple, Medium and Complex. For example, a server providing file and print functions would be rated a Simple server, and a server providing database functions would be rated as a Complex server.

From this rating, the relative weight is assigned. Also, as above, the categories can be expanded to accommodate additional types of applications.

The above-described procedure may be used in a number of ways, some of which are discussed below.

Benchmarking

When a service provider delivers services in outsourcing contracts, there are times when the provider is subject to benchmarking clauses. These are onerous and place the provider at a disadvantage. The consultants to perform the benchmarking compare one environment to others and these comparisons are flawed because there is no method to normalize the relative sizes or the functions being compared. The present invention can be used to remove these discrepancies.

Financial

In the past, service providers have signed contracts which did not take computer size or function into account. This has placed providers in a position of financial risk because of changing technology. As computer servers become larger, greater skill is required to support them, which burdens providers with greater labor cost. The same is true with changes in client application mixes. Not having a method to mitigate this exposes service providers to financial loss.

Business

An important consideration to service providers is how well are they performing in IGS. In order to determine this, one of the measurements they need to understand is the labor productivity that they are achieving in their accounts. However, as technology changes and servers get larger or applications change, the service providers cannot make this comparison without a method to account for that change.

Other

In these endeavors, there are a large number of servers being supported. A significant problem is a method to count things in these environments. The above-disclosed approach simplifies the counting and provides a means by which one can estimate the relative sizes and functions with a high degree of accuracy.

The above-described approach is a significant improvement over the prior art because it accounts for the change in technology. As an example, a computer in the late 1970s might have had one CPU and 64 K of RAM. A more recent computer system might have eight CPUs and 2 GB RAM. From the above formula, the SIPRs for these servers would be 0.00006 and 16 respectively. The SIPCs would be 1 and 3, respectively.

In accordance with another aspect of this invention, an algorithm is provided to measure two elements of computer systems. The first is the relative power of a computer system. The second is the relative administrative effort to manage computer systems.

Figure 2:
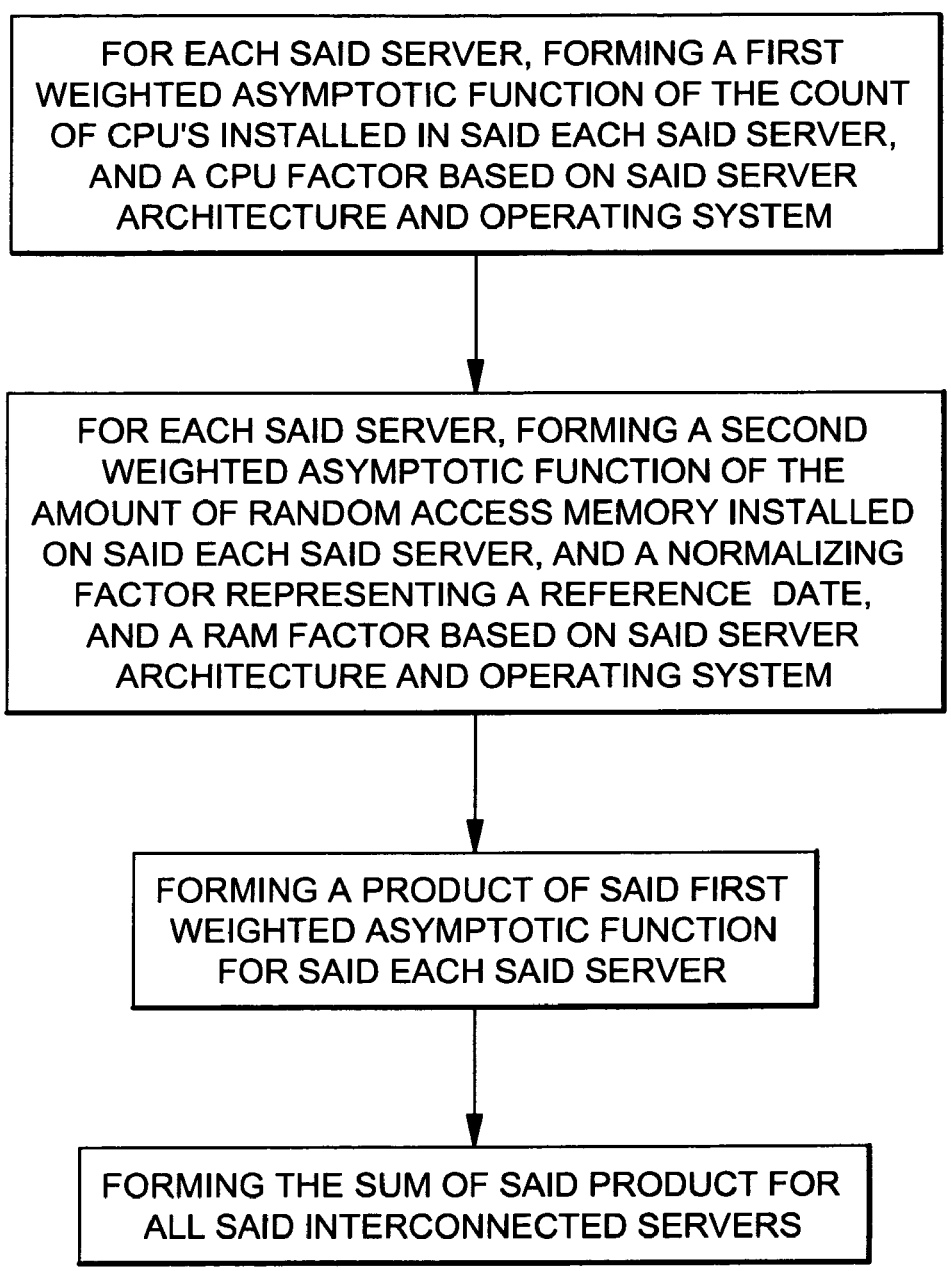
FIG. 2 outlines a method embodying a second aspect of the present invention.

With reference to FIG. 2, this method measures the size of a distributed system of interconnected servers. The method comprises the steps of, for each said server, forming a first weighted asymptotic function of the count of CPUs installed on said each said server, and a CPU factor based on said server architecture and operating system; and for each said server, forming a second weighted asymptotic function of the amount of random access memory installed on said each said server, and a normalizing factor representing a reference date, and a RAM factor based on said server architecture and operating system. The method comprises the further steps of forming a product of said first weighted asymptotic function and said second weighted asymptotic function for said each said server, and forming the sum of said product for all said interconnected servers.

This algorithm can be represented by the following equation:

$$F_x = (1 + w_c \cdot \log_2(c) \pm e_c) \cdot (1 + w_r \cdot \log_2(r/R_y) \pm e_r)$$

Where:

$F_x$ is the factor be measured and is either P for the relative power measurement or A for the relative administrative effort.

$w_c$ is a weighing factor dependent on $F_x$ and based on the Central Processing Units (CPUs) installed on the system.

$w_r$ is a weighing factor dependent on $F_x$ and based on the amount of Random Access Memory (RAM, a.k.a. main memory) installed on the system.

c is the count of CPUs installed on the system.

r is the count of RAM installed on the system in units of megabytes (MB) divided by c, the count of CPUs installed on the system.

$R_y$ is a normalization factor which represents the base reference year RAM.

$e_c$ is a CPU estimating factor based on the system architecture and operating system.

$e_r$ is a RAM estimating factor based on the system architecture and operating system.

As examples, the values for the calculation of the relative power may be, $w_c = 2$
$w_r = 0.20$
$R_y = 512$ and for the calculation of the relative administrative cost, $w_c = 0.30$
$w_r = 0.20$
$R_y = 512$ Furthermore, the algorithm can be presented in the more general form:

$$F_x = f_{CPU}(c) \cdot f_{RAM}(r)$$

where $f_{CPU}$ and $f_{RAM}$ represent asymptotic functions of the form:

$$f_x = A(x) \pm e_x$$

where the accuracy of the slope of the asymptote correlates to the order of magnitude of the estimating factor $e_x$. For example, second and third degree polynomials, of the inverted form $$y = ax^3 + bx^2 + c$$

can be used to vary the accuracy.

Figure 3:
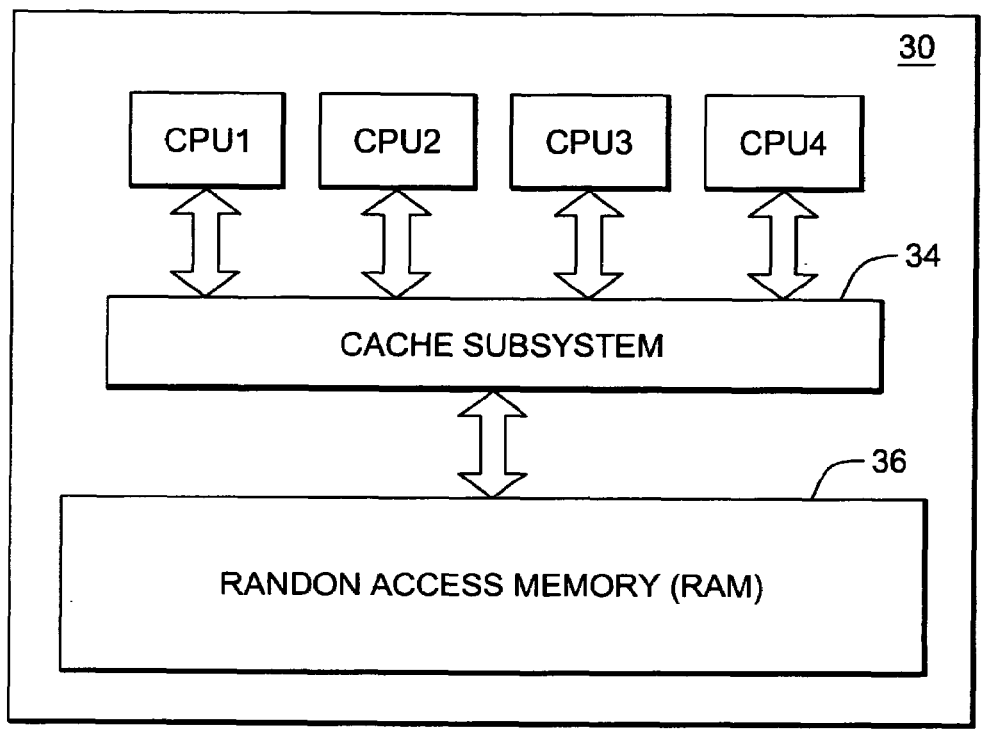
FIG. 3 illustrates the components of a computer system that may be used to practice this invention.

As will be understood by those skilled in the art, any suitable computing or calculating system or apparatus may be used to practice this invention. For example, a suitable computer system illustrated at 30 in FIG. 3 may be used. System 30, generally, comprises a series of CPUs, a cache subsystem 34, and a Random Access Memory RAM) 36. Also, as will be understood by those skilled in the art, the present invention may be embodied in a computer program storage device (including software embodied on a magnetic, electrical, optical or other storage device) for normalizing the comparison of computer servers.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A system for measuring the size of a distributed system of interconnected computer servers, said system comprising:
   means for identifying a distributed system of interconnected computer servers, each server having a number of CPUs and an amount of random access memory (RAM) installed in the server;

means for forming, for each said server, a first weighted asymptotic function of the count of CPUs installed in said each said server, and a CPU factor based on said server architecture and operating system;

means for forming, for each said server, a second weighted asymptotic function of the amount of random access memory installed on said each said server, and a normalizing factor representing a reference date, and a RAM factor based on said server architecture and operating system;

means for forming a product of said first and second weighted asymptotic functions for said each said server; and means for forming the sum of said products for all said interconnected computer servers to obtain a measure of the size of said distributed system of computer servers.

2. The system of claim 1, wherein support manpower is allocated for said distributed system of computer servers based on said sum.

3. The system of claim 1, wherein the first weighted asymptotic function is represented as $f_{CPU}$ and is of the form:

$$F_{CPU}=A(x)+e_x.$$

4. The system of claim 1, wherein the second weighted asymptotic function is represented as $f_{RAM}$ and is of the form:

$$F_{RAM}=A(x)+e_x.$$

5. The system of claim 1, wherein the reference date represents a base reference year RAM.

6. A method of measuring the size of a distributed system of interconnected computer servers, said method comprising the steps of:

identifying a distributed system of interconnected computer servers, each server having a number of CPUs and an amount of random access memory (RAM) installed in the server;

for each said server, forming a first weighted asymptotic function of the count of CPUs installed in said each said server, and a CPU factor based on said server architecture and operating system;

for each said server, forming a second weighted asymptotic function of the amount of random access memory installed on said each said server, and a normalizing factor representing a reference date, and a RAM factor based on said server architecture and operating system;

forming a product of said first and second weighted asymptotic functions for said each said server; and forming the sum of said products for all said interconnected computer servers to obtain a measure of the size of said distributed system of computer servers.

7. The method of claim 1, further comprising the step of allocating support manpower for said distributed system of computer servers based on said sum.

8. The method of claim 1, wherein the first weighted asymptotic function is represented as $f_{cpu}$ and is of the form:

$$F_{CPU}=A(x)+e_x.$$

9. The method of claim 1, wherein the second weighted asymptotic function is represented as $f_{RAM}$ and is of the form:

$$F_{RAM}=A(x)+e_x.$$

10. The method of claim 1, wherein the reference date represents a base reference year RAM.

11. A program storage device readable by machine, tangibly embodying a program of instructions executable by the machine to perform method steps for measuring the size of a distributed system of interconnected computer servers, said method steps comprising:

identifying a distributed system of interconnected computer servers, each server having a number of CPUs and an amount of random access memory (RAM) installed in the server;

for each said server, forming a first weighted asymptotic function of the count of CPUs installed in said each said server, and a CPU factor based on said server architecture and operating system;

for each said server, forming a second weighted asymptotic function of the amount of random access memory installed on said each said server, and a normalizing factor representing a reference date, and a RAM factor based on said server architecture and operating system;

forming a product of said first and second weighted asymptotic functions for said each said server; and forming the sum of said product for all said interconnected computer servers to obtain a measure of the size of said distributed system of computer servers.

12. The program storage device of claim 11, wherein said method steps further comprise the step of allocating support manpower for said distributed system of computer servers based on said sum.

13. The program storage device of claim 11, wherein the first weighted asymptotic function is represented as $f_{cpu}$ and is of the form:

$$F_{CPU}=A(x)+e_x.$$

14. The program storage device of claim 11, wherein the second weighted asymptotic function is represented as $f_{RAM}$ and is of the form:

$$F_{RAM}=A(x)+e_x.$$

15. The program storage device of claim 11, wherein the reference date represents a base reference year RAM.

16. A method for measuring the size of a distributed system of interconnected computer servers, the system including plural central processing units, and an amount of random access memory, the method comprising the steps of:

identifying a distributed system of interconnected computer servers, each server having a number of CPUs and an amount of random access memory (RAM) installed in the server;

computing a relative power measurement, $F_x$, for the system of interconnected servers by using the equation:

$$F_x=(1w_c \cdot \log_2(c) \pm e_c) \cdot (1w_r \cdot \log_2(r/R_y) \pm e_r)$$

Where:

$F_x$ is the relative power measurement, $w_c$ is a weighing factor dependent on $F_x$ and based on the Central Processing Units (CPUs) installed on the system, $w_r$ is a weighing factor dependent on $F_x$ and based on the amount of Random Access Memory (RAM) installed on the system, c is the count of CPUs installed on the system, r is the count of RAM installed on the system in units of megabytes (MB) divided by c, the count of CPUs installed on the system, $R_y$ is a normalization factor which represents the base reference year RAM, $e_c$ is a CPU estimating factor based on the system architecture and operating system, and $e_r$ is a RAM estimating factor based on the system architecture and operating system;

providing a means to normalize a comparison of one of said sewers to another of said servers, including the steps of:
  i) measuring a relative size of each of said one and said another server by, for each of said one and said another server (1) calculating a value SIPR=(#CPUs)×(RAM GB)×I/O, where #CPUs is the number of CPUs on the server, RAM GB is the size of the RAM on the server in units of gigabytes and I/O is a factor representing the number of input/output cards in the server, (2) providing a table for converting SIPR values to SIPC values, (3) using said table to convert the calculated SIPR value to a corresponding SIPC value, (4) assigning a relative weight to the corresponding SIPC value to obtain a weighted SIPC value;
  ii) for each of said one and said another server, assigning a weighted application value to the server based on the type of applications run on the server;
  iii) for each of said one and said another server, multiplying the weighted SIPC value for the server and the weighted application value for the server to obtain a normalized weight of the server, and
  iv) comparing the normalized weights of said one and said another of the server.

17. A method according to claim 16, wherein:

in said table, an SIPR value less than or equal to 1 is converted to an SIPC value of more than 1, but less than or equal to 2 is converted to an SIPC value of 2, an SIPR value of more than 2, but less than or equal to 25 is converted to an SIPC value of 3, an SIPR value of more than 25, but less than or equal to 100 is converted to an SIPC value of four, and an SIPR value of more than 100 but less than or equal to 512 is converted to an SIPC value of 5;

the server provides file and print functions, and the another server provides database functions; and the step of assigning a weighted application value to the server includes the steps of:
  i) providing a group of categories, said group consisting of three categories: simple, medium and complex,
  ii) rating said one server as a simple server, and
  iii) rating said another server as a complex server.

* * * * *